United States Patent [19]
Fawkes

[11] 3,745,855
[45] July 17, 1973

[54] EMERGENCY MANUAL DRIVE FOR VALVE OPERATORS

[75] Inventor: Donald G. Fawkes, Aurora, Ill.

[73] Assignee: Henry Pratt Company, Aurora, Ill.

[22] Filed: Aug. 23, 1971

[21] Appl. No.: 173,848

[52] U.S. Cl. .............................. 74/625, 192/67 R
[51] Int. Cl. ............................................. F16h 35/00
[58] Field of Search ................... 74/625; 192/67 R, 192/97, 108; 251/14, 130

[56] References Cited
UNITED STATES PATENTS

| | | | |
|---|---|---|---|
| 433,968 | 8/1890 | Unzicker | 192/67 R |
| 575,620 | 1/1897 | Seymour | 192/67 R |
| 777,374 | 12/1904 | Howard | 74/625 |
| 2,010,796 | 8/1935 | Bourque | 192/67 R |
| 2,114,981 | 4/1938 | Jackson | 192/67 R |
| 2,390,882 | 12/1945 | Hopkins | 74/625 |
| 2,772,578 | 12/1956 | Kling | 74/625 |
| 2,815,922 | 12/1957 | Thomas et al. | 75/625 |
| 3,318,171 | 5/1967 | Wilkinson et al. | 74/625 |
| 3,011,359 | 12/1961 | Morrell | 74/625 |
| 3,257,866 | 6/1966 | Fry | 74/625 |

*Primary Examiner*—Charles J. Myhre
*Assistant Examiner*—Wesley S. Ratliff, Jr.
*Attorney*—Axel A. Hofgren et al.

[57] ABSTRACT

An emergency manual operator for motorized valve operators for use in the event of power or motor failure. The exemplary embodiment employs a rotatable hand wheel which freely receives a threaded shaft. The hand wheel is fixed relative to a valve operator casing and a selectively operable lock is provided between the hand wheel and a nut threadedly received on the shaft so as to lock the two against relative rotational or longitudinal movement when manual operation is required. When the lock is established, rotation of the hand wheel will reciprocate the threaded shaft to open or close a valve to which it may be attached.

4 Claims, 3 Drawing Figures

PATENTED JUL 17 1973  3,745,855

EMERGENCY MANUAL DRIVE FOR VALVE OPERATORS

BACKGROUND OF THE INVENTION

This invention relates to valve operators, and more specifically, to emergency manual operators for use with power operated valves.

The desirability of manual backup valve operators for power operated valve systems has long been recognized. Typically, power operated valve systems employ fluid motors for driving a valve member between open and closed positions although not infrequently, electrical motors are employed. In either event, inoperability of the motor or loss of power in an electrical system or loss of pressure in a fluid operated system, renders it impossible to change the valve's position without the provision of a manual operator for accomplishing the same.

Since such valve systems are principally intended for powered operation, it has been customary to provide means whereby a manual operator employed as the backup is normally disengaged from the valve operating linkage but may be selectively engaged therewith for operating the valve when the need arises. In many instances, the means provided for allowing selective engagement or disengagement of the manual operator and the valve have been difficult to understand such that the conversion from the power operated mode to the hand operated mode may not be accomplished easily in an emergency by one unfamiliar with the system. The structure illustrated in U. S. Pat. No. 3,257,866 is regarded by some to be in this category.

Other structures do not provide for positive movement of a valve member in both directions as from an open position to a closed position and a closed position to an open position, relying on gravity or the like to accomplish movement in one of the directions. Of course, since positive control in both directions is not exerted by such systems, they may be prone to failure by reason of corrosion or the like increasing friction to the point where it cannot be overcome by the influence of gravity. One valve employing such a construction is that illustrated in U. S. Pat. No. 582,557 to Stevenson.

A variety of other systems such as those described by Paul in U. S. Pat. No. 3,103,133 and Morell in U. S. Pat. No. 3,011,359 are relatively complex in terms of the number of elements employed and/or the number of operations required to fabricate such elements in that they are not what are normally considered so-called "shelf items".

Thus, there is a real need for an inexpensive manual operator for use with power operated valves whose operation is easy to understand by simple observance so that one having no prior familiarity with the same could operate it; that is positive in its action and does not rely on extraneous forces to impart valve movement in a given direction; and which is inexpensive to manufacture.

SUMMARY OF THE INVENTION

The principal object of the invention is to provide a new and improved manual valve operator for power operated valves. More specifically, it is an object of the invention to provide such an operator that is simple to operate, is positive in its action, and which may be fabricated of relatively inexpensive components that are readily available.

The exemplary embodiment of the invention achieves the foregoing object by means of a construction that is particularly suited for use with power operated valve operators wherein a motor having a linearly movable output shaft is employed, which shaft is connected through a linkage to a valve stem so that linear movement of the output shaft of the motor is converted to movement of a valve member secured to the valve stem. More particularly, the invention employs a rotatable, manually operable member having grasping means thereon, preferably in the form of a hand wheel, which is rotatably mounted on a housing or the like for the aforementioned linkage and which may also contain the output shaft of the valve motor. A threaded shaft is formed to pass freely through the hand wheel and is adapted to be connected to either the linkage or the output shaft of the valve motor. The threaded shaft in turn mounts a threaded nut and means are provided to selectively lock the nut to the hand wheel whereupon rotation of the hand wheel will result in rotation of the nut to move the shaft relative to the housing and thus, move the linkage or the output shaft of the motor to which it is connected within the housing to control the position of the valve.

According to the preferred embodiment, the locking means comprise at least one element pivotally secured to the hand wheel and adapted to be pivoted into a slot on the nut received on the threaded shaft. A detent on the pivotal element precludes significant relative movement of the nut in one direction relative to the hand wheel while the hand wheel itself precludes significant relative movement of one to the other in the opposite direction along the length of the threaded shaft.

In order to provide an inexpensive and easily fabricated construction, the pivotal elements are formed of common eye bolts and the detents are provided by nuts threadedly received thereon. In a preferred embodiment, a plurality of such eye bolts are employed along with a commensurate number of slots on the nut received on the threaded shaft.

As a further refinement, means may be provided for normally holding the eye bolts in a position wherein they cannot engage the slotted nut.

Other objects and advantages will become apparent from the following specification taken in conjunction with the accompanying drawings.

DESCRIPTION OF THE PREFERRED EMBODIMENT

Figure 1:
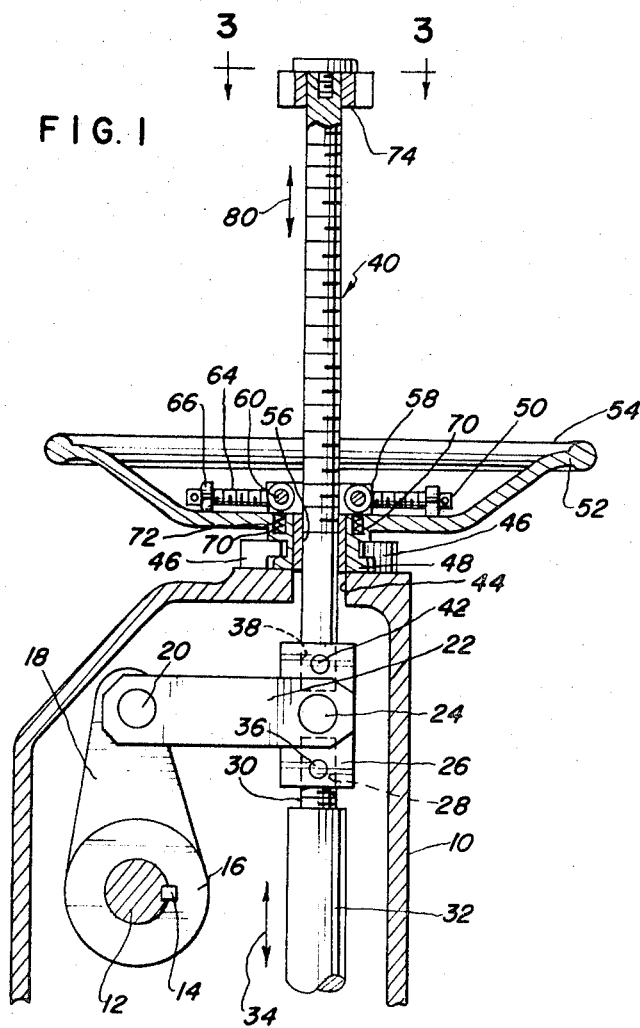
FIG. 1 is a sectional view of a valve operator made according to the invention.

An exemplary embodiment of a valve operator made according to the invention is illustrated in FIG. 1 and is seen to include an operator housing 10 into which a valve stem 12 extends. Keyed to the valve stem 12 by means of key 14 is a collar 16 forming one end of a linkage arm 18 which, in turn, has its other end pivotally connected by a pin 20 to a link 22. The end of the link 22 opposite the pin 20 is pivotally connected by a pin 24 to a connection block 26. All of the foregoing structure is contained within the housing 10.

One end of the connecting block 16 may include a threaded bore 28 for receiving the threaded reduced end 30 of an output shaft 32 of a motor (not shown). Preferably, the output shaft 32 will be a piston rod from a fluid motor that is linearly movable as indicated by an arrow 34. A set screw 36 may pass through a portion of the block 26 to secure the threaded end 30 in place within the bore 28.

The opposite end of the block 26 includes a similar bore 38 which may receive one end of a threaded shaft 40. Again, a set screw 42 may be employed to insure a sound connection between the block 26 and the shaft 40.

Figure 2:
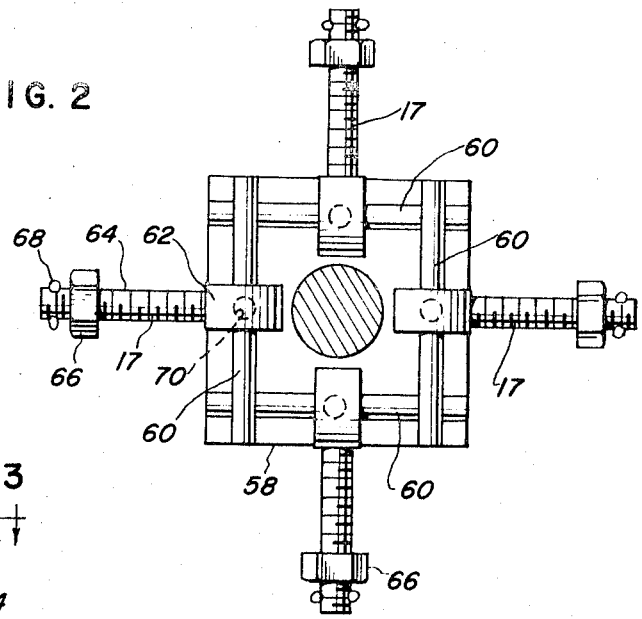
FIG. 2 is an enlarged plan view of a portion of the interlocking structure associated with the hand wheel.

The housing 10 includes an opening 44 through which the shaft 40 extends. On the exterior of the housing 10, and about the opening 44, a split flange retaining structure 46 may be provided. The split flange retaining structure 46 overlaps an enlarged end 48 of a shaft 50 secured to a hand wheel 52 which may be gripped at its periphery 54 to be rotated manually. The shaft 50 includes a central bore 56 through which the shaft 40 passes and about the point of mergence of the same opposite the enlarged end 48, there is provided an extension 58 of the hand wheel hub which is square in shape as illustrated in FIG. 2. The upper surface of the extension 58 mounts a plurality of pivot elements 60 which may be secured thereto by any suitable means. Each of the pivots passes through the eye 62 of an associated eye bolt 64 as best illustrated in FIG. 1 to define a pivotal connection between the hand wheel 52 and the associated eye bolt 64 so that each eye bolt is movable between the position illustrated in FIG. 1 through about 90° to an upright, but inverted, position. Each eye bolt 64 is additionally provided with a nut 66 threadedly received thereon while a spring pin 68 at the end of each eye bolt 64 may be provided to prevent the loss of the respective nut 66.

The hub of the hand wheel 52 additionally includes a plurality of bores 70 aligned with the eye 62 of each eye bolt and which may contain springs 72 which bear against the under surface of the respective eye 62. The resulting pressure applied to each eye bolt tends to preclude the same from rotating about its associated pivot 60 so that the springs 72 in essence serve as a means for holding each eye bolt 64 in a disengaged position as will be seen.

Figure 3:
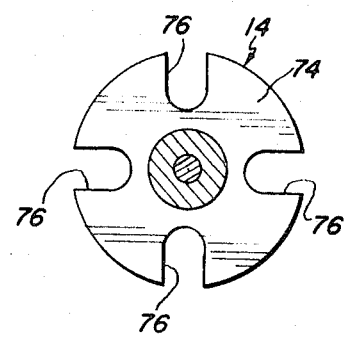
FIG. 3 is a sectional view taken approximately along the line 3—3 in FIG. 1.

Referring now to FIGS. 1 and 3, the shaft 40 threadedly mounts a nut-like structure 74 which, as best seen in FIG. 3, has on its periphery, four, radially spaced, outwardly open notches 76 for receipt of the shank of each of the eye bolts 64 when the same are moved from the position illustrated in FIG. 1, assuming that the nut 74 is sufficiently close to the hand wheel 52 to receive the same.

Normally, the nut 74 will be located at the position shown on the threaded shaft 40 and maintained thereat by any suitable means such as, for example, a conventional seal wire. In such a position, the valve associated with the shaft 12 is adapted to be operated by operation of its motorized power source.

Should power operation be impossible by reason of power failure or motor failure, and manual operation is desired, it is merely necessary to break the seal wire to rotate the nut 74 down on the shaft 40 as close as possible to the hand wheel 52. At this time, each of the eye bolts 64 may be pivoted about the pivot 60 in such a way that the shank of each is received in the corresponding one of the slots 76 and the associated nut 66 overlies the upper surface of the nut-like structure 74. In this position, the nuts 66 serve as detents to preclude substantial relative longitudinal movement between the hand wheel and the nut-like structure 74 and, of course, to insure positive retention, the nuts 66 preferably are tightened down upon the nut-like structure 74 to strongly lock the hand wheel 52 and the nut-like structure 74 together and preclude any sort of relative movement therebetween. When such is the case, the hand wheel 52 may merely be rotated with the result that the operation of the split flange retainer 46 maintaining the position of the hand wheel 52 constant relative to the valve will result in movement of the shaft 40 in the direction of an arrow 80. Such motion of the shaft 40 will be transmitted by the linkage 18, 22 to the valve stem 12 to ultimately control the position of the valve.

From the foregoing, it will be appreciated that the invention accomplishes its objects inasmuch as the manner by which the manual block actuator is engaged will be readily apparent to even the most casual observer by reason of the simplicity thereof; provides positive valve movement in both direction without relying on external forces such as gravity; and may be easily formed by reason of use of easily obtainable parts, such as the eye bolts 66.

I claim:

1. In a valve operator including a valve motor having a movable output shaft and a linkage connected thereto and adapted to be connected to a valve member for moving the valve member between open and closed positions in response to movement of said output shaft, an auxiliary manually operable valve operating means adapted to control the position of the valve in the event of failure of the valve motor, the improvement in said auxiliary, manually operable means comprising: a rotatable member including grasping means thereon adapted to be manually rotated; means mounting said rotatable member for rotation in a fixed position relative to a valve with which the same may be used; a threaded shaft secured to one of said linkage and said output shaft and adapted, when moved, to change the position of the valve to which the linkage may be attached, said threaded shaft passing freely through a portion of said rotatable member; a nut-like structure rotatably received on said threaded shaft; and selectively operable interlocking means on said nut-like structure and said rotatable member for locking said rotatable member against movement relative to said nut-like structure whereby rotation of said rotatable member will cause rotation of said nut-like structure to linearly move said threaded shaft to change the position of a valve to which said linkage may be attached; said interlocking means comprising at least one pivotal member mounting a detent and pivotally secured to one of the rotatable member and said nut-like structure and at least one slot in the other of said rotatable member and said nut-like structure for selectively receiving said pivotal element, said detent substantially preventing longitudinal movement of the slotted one of said nut-like structure and said rotatable member with respect to the other.

2. The valve operator of claim 1 wherein said pivotal element comprises an eye bolt pivotally secured to said rotatable member by a pin extending through the eye thereof, and said detent comprises a nut rotatably received on said eye bolt, said slot being formed in the periphery of said nut-like structure.

3. The valve operator of claim 2 wherein there are provided a plurality of said eye bolts, each having a nut threadedly received thereon; and said nut-like structure includes a plurality of eye bolt receiving slots.

4. The valve operator of claim 1 further including means for normally holding said pivotal element in a position disengaged from said slot.

* * * * *